United States Patent [19]

Matsuoka et al.

[11] Patent Number: 4,751,394
[45] Date of Patent: Jun. 14, 1988

[54] APPARATUS FOR RECORDING AND/OR REPRODUCING INFORMATION USING A CARD-LIKE RECORDING MEDIUM

[75] Inventors: Kazuhiko Matsuoka, Kanazawa; Kenichi Suzuki, Yokohama; Akio Aoki, Tokyo; Kazuo Minoura, Yokohama, all of Japan

[73] Assignee: Canon Kabushiki Kaisha, Tokyo, Japan

[21] Appl. No.: 903,374

[22] Filed: Sep. 3, 1986

[30] Foreign Application Priority Data

Sep. 6, 1985 [JP] Japan .................. 60-196037

[51] Int. Cl.[4] ........................................... G01N 21/86
[52] U.S. Cl. .................................. 250/561; 250/223 R
[58] Field of Search ................... 250/561–569, 250/223 R; 209/528; 235/437, 438, 479, 480, 482

[56] References Cited

U.S. PATENT DOCUMENTS

| 3,612,888 | 10/1971 | Boucher | 250/569 |
| 4,019,025 | 4/1977 | Taniguchi et al. | 235/480 |
| 4,114,028 | 9/1978 | Baio et al. | 235/482 |
| 4,613,942 | 8/1986 | Chen | 250/561 |

Primary Examiner—David C. Nelms
Assistant Examiner—Stephone B. Allen
Attorney, Agent, or Firm—Fitzpatrick, Cella, Harper and Scinto

[57] ABSTRACT

An information recording/reproducing apparatus uses a card-like recording medium having an area for information recording and a blank area, the area for information recording having a reflectivity different from that of the blank area. The apparatus includes a head unit for performing at least one of recording and reproduction, an autotracking servo, a stepping motor and the like cooperating to cause the card to reciprocate relative to the head unit, and an abnormal state detect circuit for detecting whether the card is inserted in the apparatus in a normal state. The abnormal state detect circuit includes a photosensing unit consisting of a light-emitting element for emitting light rays onto the card and a light-receiving element for receiving the light rays from the card. The photosensing unit is deviated with respect to a central portion of the card along a direction perpendicular to a reciprocal movement of the card so that the area for information recording is irradiated with the light rays from the light-emitting element upon insertion of the card in the normal state.

4 Claims, 4 Drawing Sheets

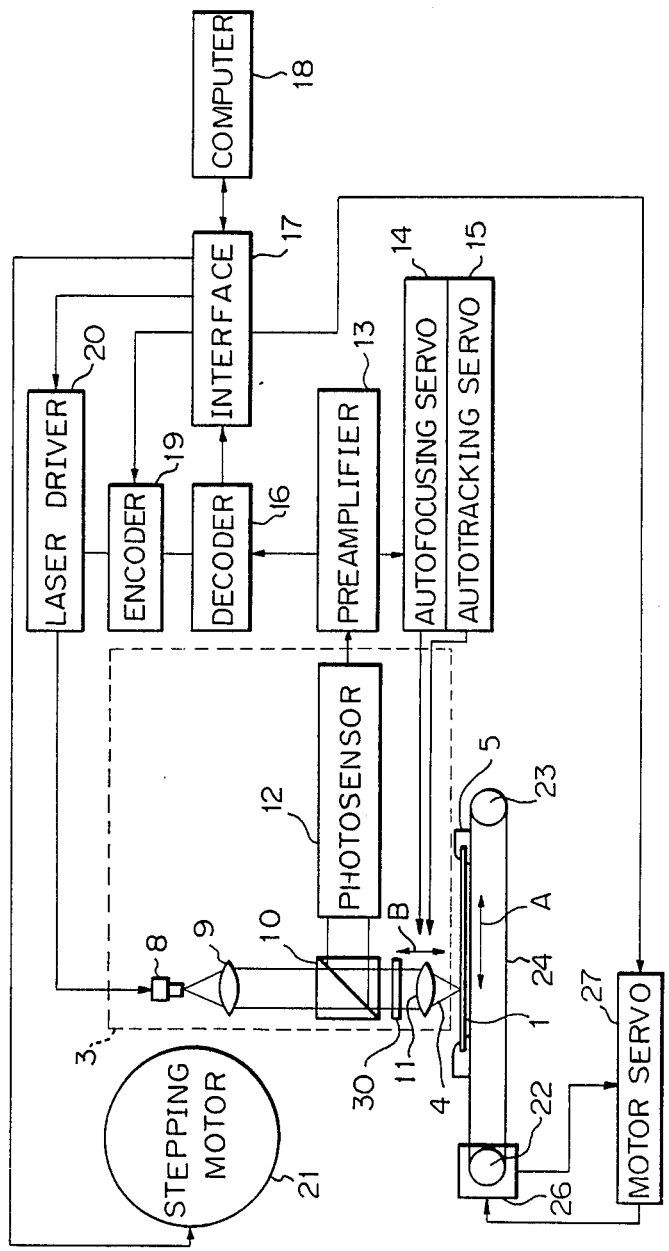

APPARATUS FOR RECORDING AND/OR REPRODUCING INFORMATION USING A CARD-LIKE RECORDING MEDIUM

BACKGROUND OF THE INVENTION

1. Field of the Invention

The present invention relates to an information recording/reproducing apparatus for recording and/or reproducing information on a recording medium and, more particularly, to an apparatus using a card- or sheet-like information recording medium as a medium.

2. Related Background Art

Typical conventional information recording/reproducing apparatuses of the type described above are optical and magnetic ones. An optical information recording/reproducing apparatus has received a great deal of attention since it has a large memory capacity. Other various media such as optical disks, optical cards, and optical tapes have been known as conventional media for recording/reproducing information using light. These conventional media have different features and advantages so that they are used according to individual applications. Among these conventional optical media, optical cards are expected to be more and more popular in a variety of applications in favor of easy fabrication, portableness, and easy access.

Various schemes for scanning an optical card with a beam are proposed. A beam spot is linearly reciprocated on a medium, and at the same time, the beam spot position is relatively moved in a direction perpendicular to the direction of reciprocal movement. This scheme requires a simple mechanism and an effective space on the medium is advantageously large.

An optical information recording/reproducing apparatus using this scheme is illustrated in FIG. 1.

Referring to FIG. 1, an optical card 1 is placed on a shuttle 5. A laser beam 4 is emitted from a laser 8. A collimator lens 9 is arranged at the output side of the laser 8. A polarizing beam splitter 10 is arranged below the collimator lens 9 along the optical axis thereof. An objective lens 11 is arranged immediately above the optical card 1 along the optical axis of the collimator lens 9. A $\lambda/4$ plate 30 is inserted between the polarizing beam splitter 10 and the objective lens 11. A combination of the polarizing beam splitter 10 and the $\lambda/4$ plate 30 allows transmission of the laser beam incident from the side of the collimator lens 9 so as to record information on the optical card. However, the combination inhibits transmission of the laser beam 4 reflected by the optical card 1 but reflects it in a direction perpendicular to the optical axis of the collimator lens 9.

A photosensor 12 receives the beam reflected by the polarizing beam splitter 10. The laser 8, the collimator lens 9, the polarizing beam splitter 10, the $\lambda/4$ plate 30, the objective lens 11, and the photosensor 12 constitute an optical head (a block surrounded by the broken line in FIG. 1). The optical information recording/reproducing apparatus also includes a preamplifier 13, an autofocusing servo 14, an autotracking servo 15, a decoder 16, an interface 17, a computer 18, an encoder 19, a laser driver 20, and a stepping motor 21. The stepping motor 21 drives the optical head 3 in a direction perpendicular to the drawing surface.

An endless belt 24 is looped between pulleys 22 and 23. The shuttle 5 is mounted on the belt 24 to support and fix the optical card 1 on the belt 24. The pulley 22 is mounted on a rotating shaft of the motor 26. The optical card 1 can reciprocate along a direction indicated by a double-headed arrow A upon rotation of the motor 26.

The information reproduction mode of the information recording/reproducing apparatus in FIG. 1 will be described hereinafter.

Referring to FIG. 1, the laser beam generated by the laser 8 is collimated by the collimator lens 9. The collimated beam passes through the polarizing beam splitter 10 and the $\lambda/4$ plate 30. The laser beam from the $\lambda/4$ plate 30 is focused by the objective lens 11 to form a laser beam spot on the optical card 1. A laser beam reflected by the optical card 1 is modulated according to the presence/absence of an information pit. The modulated beam is collimated by the objective lens 11 and reflected by the polarizing beam splitter 10. The polarized laser beam is then incident on the photosensor 12. The photosensor 12 detects the intensity of the modulated beam and converts it into an electrical signal. The electrical signal from the photosensor 12 is sent to the preamplifier 13. An output from the preamplifier 13 is sent to the autofocusing servo 14. A signal from the autofocusing servo 14 is supplied to an actuator (not shown). The actuator drives the objective lens 11 in a direction indicated by a double-headed arrow B so that a distance between the objective lens 11 and the optical card 1 is controlled to form a spot of the laser beam 4 on the optical card 1.

The signal from the preamplifier 13 is also supplied to the autotracking servo 15. A signal from the autotracking servo 15 is supplied to the actuator (not shown). The actuator vertically drives the objective lens 11 with respect to the surface of the drawing so as to focus the laser beam 4 at a predetermined position. Various systems of the autofocusing servo 14 and the autotracking servo 15 have been proposed. For example, the laser beam 4 is split into a plurality of beams by a grating or the like. An autofocusing or autotracking track is preformatted on the optical card 1. At least one of the beams is used to reproduce information. Other beams are used to extract autofocusing and autotracking signals.

The signal from the preamplifier 13 is supplied to the decoder 16 and is electrically processed. The processed signal is supplied to the interface 17. An information signal is supplied from the interface 17 to the computer 18. A signal is sent from the interface 17 to the encoder 19 and is properly modulated. The modulated signal is used to control oscillation of the laser 8 through the laser driver 20.

The interface 17 also supplies a signal to the stepping motor 21 and the motor servo 27 to control the vertical position of the optical head 3 with respect to the surface of the drawing and rotation of the motor 26.

It is very important to detect whether the card is properly inserted in the information recording/reproducing apparatus regardless of optical and magnetic cards. More specifically, if the card is inserted such that the recording medium surface does not contact the recording/reproducing head (to be referred to as reverse insertion hereinafter), or if the card is inserted such that the rear end is inserted first (to be referred to as backward insertion hereinafter), reverse or backward insertion must be immediately detected and the corresponding card must be dispensed outside the apparatus.

When reverse and backward insertion detecting means are separately arranged inside the apparatus, the number of components is increased to undesirably result in high cost, a bulky arrangement, and degradation of reliability.

SUMMARY OF THE INVENTION

It is an object of the present invention to provide a card recording/reproducing apparatus having a function for discriminating card reverse insertion and card backward insertion by a single detecting means.

It is another object of the present invention to provide a card recording/reproducing apparatus capable of causing the detecting means to detect whether a card position in the apparatus is a desired position.

In the recording/reproducing apparatus of the present invention, an information recording medium surface of a card has a different reflectivity from that of the other surface. In addition, the recording medium portion of the card is deviated along a direction perpendicular to the card insertion direction. The information recording/reproducing apparatus of the present invention comprises an optical abnormal state detecting means consisting of a light-emitting element for emitting light rays onto the card and a light-receiving element for receiving light rays reflected by the card. An output from the light-receiving element is compared by an abnormal state detect circuit with an output obtained upon insertion of the card in a normal state, thereby discriminating whether the card is normally (properly) inserted in the apparatus. A photosensing unit consisting of the light-emitting element and the light-receiving element is shifted to one side with respect to the central line in a direction perpendicular to the card insertion direction. The position of the photosensing unit is determined as follows. If the card is inserted in the normal state, the photosensing unit detects a reflectivity of the card recording medium portion. However, if the card is inserted in an abnormal state, the photosensing unit detects a reflectivity from a surface excluding the card recording medium portion.

A means for detecting an output from the light-receiving element of the abnormal state detecting means and whether the card is normally inserted can measure reflectivities of the card in all card insertion states and store the reflectivity data. The output from the light-receiving element is compared with the storage value to detect the card state. In this case, a specific card insertion state can be detected so that it may be displayed to the user.

The photosensing unit in the abnormal state detecting means can also be used to detect a card position according to a specific position thereof. For example, if a card is placed on a shuttle and is moved, the photosensing unit can be arranged near a card abutment (i.e., a stopper) of the shuttle. However, if a card is fed singly, the photosensing unit can be arranged at a position such that the light rays from the light-emitting element in the photosensing unit are radiated onto the card when the card is located at a desired position with respect to the recording/reproducing head in the recording or reproducing mode.

BRIEF DESCRIPTION OF THE DRAWINGS

FIG. 1 is a schematic view showing an optical information recording/reproducing apparatus according to an embodiment of the present invention;

DESCRIPTION OF THE PREFERRED EMBODIMENT

The present invention will be described in detail with reference to a preferred embodiment in conjunction with the accompanying drawings. An information recording/reproducing apparatus according to the present invention is applicable to a magnetic one as well as an optical one. For the sake of simplicity, the apparatus is exemplified as an optical card recording/reproducing apparatus.

Figure 2A:
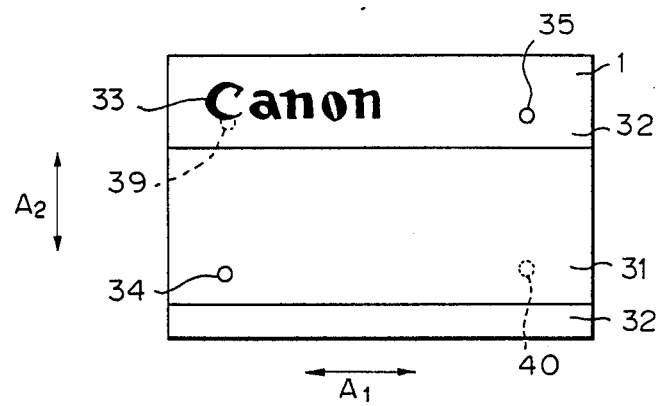
FIGS. 2(a) and 2(b) are respectively a plan view and a sectional view of an optical card used in the information recording/reproducing apparatus in FIG. 1.
Figure 2B:
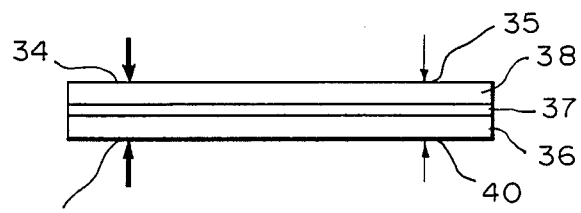

FIGS. 2(a) and 2(b) are respectively a plan view and a sectional view of an optical card 1. Referring to FIG. 2(a), the information recording surface of the optical card 1 is divided into an information recording area 31 and a remaining blank area 32. It is possible to mark a logo (logogram) 33 in the blank area 31 so as to allow a user to visually check the type and purpose of the optical card 1. In general, the information recording area 31 and the blank area 32 have different reflectivities. The information recording area 31 of the optical card 1 is shifted to one side with respect to the central line along a direction A2 perpendicular to a card insertion direction A1.

FIG. 2(b) illustrates a sectional structure of the optical card 1. An optical recording medium 37 is adhered between a base plate 36 of a polymeric resin and a transparent protective layer 38.

It is assumed that if the user inserts the optical card 1 in FIG. 2(a) correctly with reference to the back-and-forth and the upper-and-lower directions, light rays from the light-receiving element in the photosensing unit of the abnormal state detecting means consisting of the light-emitting and light-receiving elements are set such that the light-receiving element is located to read a point 34 in the information recording area 31 on the optical card. Under this assumption, when the user inserts the optical card 1 backward, i.e., backward insertion, the photosensing unit detects light reflected by a point 35 in the blank area 32. Therefore, the detection signals derived upon detection of the points 34 and 35 represent different levels (intensity levels), thereby detecting that the optical card 1 has not been inserted in the normal state.

Similarly, when the user inserts the optical card 1 upside down, the photosensing unit reads a point 39 on the reverse surface of the optical card 1. When the user inserts the optical card 1 upside down and backward, the photosensing unit reads a point 40 on the reverse surface of the card. The points 39 and 40 have different reflectivities from that of the point 34, thereby detecting that the optical card has not been inserted in the normal state.

Figure 3:
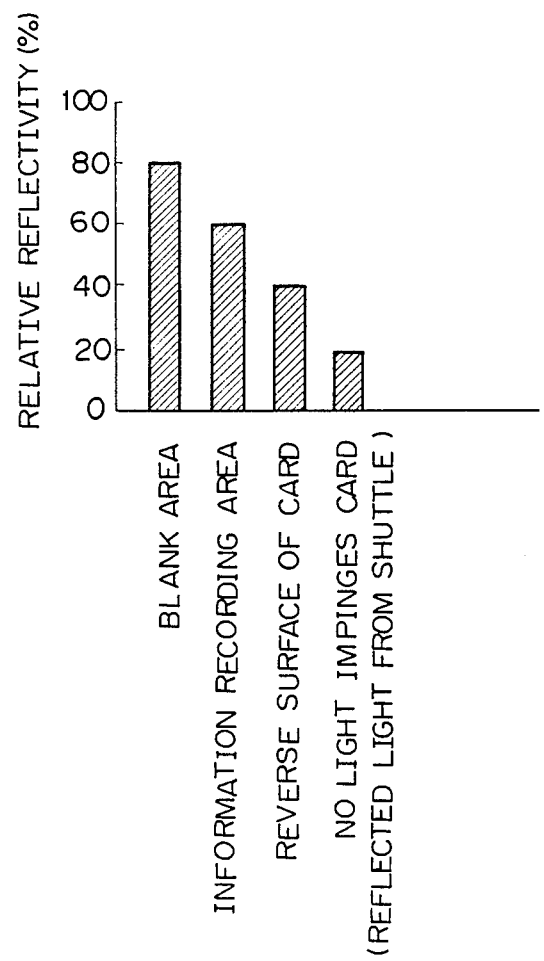
FIG. 3 is a graph showing relative reflectivities of the recording card.

In order to detect different types of abnormality, i.e., reverse insertion, backward insertion, and detection whether the card is fed to the desired position, detection signals are compared with the prestored signals to detect the types of abnormality. Different types of abnormality detection must be performed by a single optical abnormality detecting means according to different intensities of light. For this purpose, a card can be manufactured such that the reflectivities of the reverse surface of the card, the information recording area 31, and the blank area 32 are set to be different from each other. FIG. 3 is a graph showing relative reflectivities of such an optical card 1. Reflectivities greatly differ from each other in the four cases plotted along the abscissa. Light reflected by the card 1 is received by the light-receiving element, and its intensity is compared with a corresponding reference intensity to detect the type of abnormality.

Alternatively, different colors may be used for different areas of the recording medium. In this case, wavelengths of beams reflected by the areas of different colors may be measured to check the types of abnormality. Furthermore, the precision of the abnormality state detecting means can be improved to increase the number of types of abnormality which can be detected. In this case, minor abnormality such as a ramp state of the card with respect to the recording/reproducing head due to a foreign material can be detected.

As described above, the output from the light-receiving element is compared with a preset value corresponding to the type of abnormality to detect the presence/absence of abnormality or its type.

Figure 4:
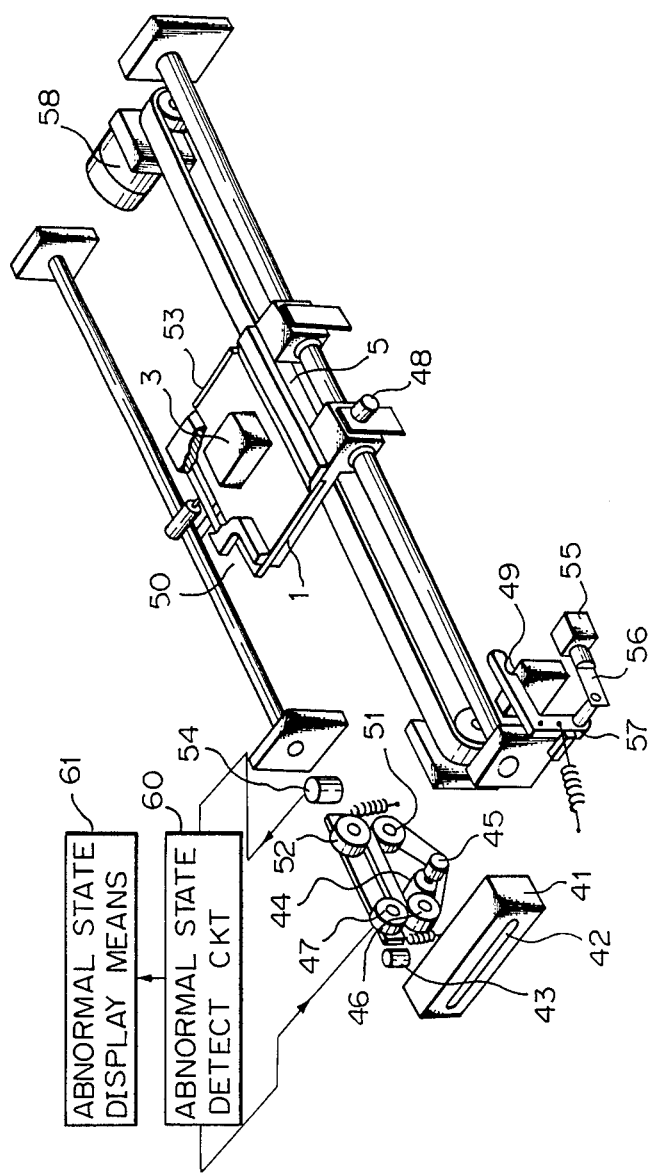
FIG. 4 is a schematic perspective view showing a card convey mechanism and its vicinity in the optical information recording/reproducing apparatus in FIG. 1.

FIG. 4 is a schematic perspective view showing a card convey mechanism in the card recording/reproducing apparatus with the abnormal state detecting means. It should be noted that the optical head for recording and/or reproducing information has been described in detail with reference to FIG. 1, and a detailed description thereof will be omitted.

Referring to FIG. 4, when the user inserts an optical card 1 through an opening 42 of a card insertion port 41, a photosensor 43 detects insertion of the optical card 1, and a motor 44 is rotated to drive a pulley 45. When the user further inserts the optical card 1, the distal end of the optical card is inserted between rollers 46 and 47 and is guided by a guiding means (not shown) and fed in the upper right direction (FIG. 4). In this case, a shuttle 5 is located at a position where a projection 48 is engaged with a recess 49. Rollers 51 and 52 are inserted in a notch 50 of the shuttle 5. Upon further rotation of the motor 44, the optical card 1 is inserted inside the shuttle 5 by the rollers 51 and 52 until the optical card 1 abuts against a stopper 53. When a predetermined period of time has elapsed after the photosensor 43 detects conveyance of the optical card 1, the motor 44 is stopped. A photosensing unit 54 in the abnormal state detecting means comprises light-emitting and light-receiving elements. The function of the photosensing unit 54 has been described with reference to FIGS. 2 and 3. A signal detected by the photosensing unit 54 is discriminated by an abnormal state detect circuit 60 to determine whether it indicates an abnormal value. If an abnormal state is detected, the motor 44 is rotated in the reverse direction in response to a signal from the abnormal state detect circuit 60. The optical card 1 is dispensed outside the apparatus from the opening 42 of the card insertion port 41. In this case, if the abnormal state detect circuit 60 can detect the type of abnormality, the type can be displayed on a display means 61 so that the user can know the type of abnormality.

If the photosensing unit 54 in the abnormal state detecting means is arranged near the stopper 53 of the shuttle 5 in the standby state before the optical card 1 is inserted, light reflected by the shuttle 5 can be detected upon jam of the optical card 1 in the apparatus. In this manner, an abnormality can be detected wherein the card is not located at the desired position.

However, if no abnormality is detected by the abnormal state detecting means, a solenoid 55 draws a lever 56 to disengage the projection 48 of the shuttle 5 from the recess 49 of the lever 57. At the same time, after a lapse of a predetermined delay time, a motor 58 is rotated to move the shuttle 5 in the upper right direction, thereby causing the optical head 3 to perform recording or reproduction.

In the information recording/reproducing apparatus according to the present invention as described above, since the card insertion state can be detected by a single optical abnormal detecting means, a compact, low-cost apparatus can be achieved with high reliability.

What is claimed is:

1. An information recording/reproducing apparatus using a card-like recording medium having an area for information recording and another area, the area for information recording having a reflectivity different from that of the another area, comprising:
    a head unit for performing at least one of recording and reproduction;
    means for causing the card to reciprocate relative to said head unit; and
    means for detecting whether the card is inserted in said apparatus in a normal state;
    said detecting means being provided with a photosensing unit comprising a single light-emitting element for emitting light rays onto the card and a light-receiving element for receiving the light rays from the card, said photosensing unit being deviated with respect to a central portion of the card along a direction perpendicular to a reciprocal movement of the card so that the area for information recording is irradiated with the light rays from said light-emitting element upon insertion of the card in the normal state.

2. An apparatus according to claim 1, wherein said detecting means comprises a detector for detecting in response to a signal from said light-receiving element whether the card is normally inserted, the card being dispensed outside said apparatus in response to an output from said detector.

3. An apparatus according to claim 2, wherein said detector discriminates types of abnormality upon insertion of the card and generates a discrimination result, the discrimination result being displayed on display means.

4. An information recording/reproducing apparatus using a card-like recording medium having a first area for information recording and a second area, the first area for information recording having a reflectivity different from that of the another area, comprising:
    a head unit for performing at least one of recording and reproducing;
    means for causing the card to reciprocate relative to said head unit; and
    means for detecting whether the card is inserted in said apparatus in a normal state or an abnormal state;
    said detecting means being provided with a photosensing unit comprising a single light-emitting element for emitting light rays onto the card and a light-receiving element for receiving the light rays from the card, said photosensing unit being deviated with respect to a central portion of the card along a direction perpendicular to a reciprocal movement of the card so that the second area is irradiated with the light rays from said light-emitting element upon insertion of the card in the abnormal state.

* * * * *

UNITED STATES PATENT AND TRADEMARK OFFICE
CERTIFICATE OF CORRECTION

PATENT NO. : 4,751,394

DATED : June 14, 1988

INVENTOR(S) : K. Matsuoka, et al.

It is certified that error appears in the above-identified patent and that said Letters Patent is hereby corrected as shown below:

COLUMN 1

Line 12, "medium as a medium." should read
           --medium.--.

COLUMN 2

Line 47, "intcrface 17" should read
           --interface 17--.

COLUMN 4

Line 23, "blank area 31" should read
           --blank area 32--.

COLUMN 5

Line 6, "card 1" should read
           --optical card 1--.

Column 6

Line 49, "another" should read -- a second --.

Signed and Sealed this

Twenty-eighth Day of March, 1989

Attest:

DONALD J. QUIGG

Attesting Officer          Commissioner of Patents and Trademarks